(12) United States Patent
Li et al.

(10) Patent No.: US 11,388,114 B2
(45) Date of Patent: Jul. 12, 2022

(54) PACKET PROCESSING METHOD AND APPARATUS, COMMUNICATIONS DEVICE, AND SWITCHING CIRCUIT

(71) Applicant: Huawei Technologies Co., Ltd., Shenzhen (CN)

(72) Inventors: Nan Li, Beijing (CN); Chao Huang, Beijing (CN); Lixia Xiong, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/171,661

(22) Filed: Feb. 9, 2021

(65) Prior Publication Data
US 2021/0168095 A1 Jun. 3, 2021

Related U.S. Application Data

(63) Continuation of application No. PCT/CN2019/098050, filed on Jul. 27, 2019.

(30) Foreign Application Priority Data

Aug. 10, 2018 (CN) .......................... 201810912207.4

(51) Int. Cl.
H04L 49/90 (2022.01)
H04L 47/32 (2022.01)
H04L 47/12 (2022.01)

(52) U.S. Cl.
CPC .............. H04L 49/90 (2013.01); H04L 47/32 (2013.01); H04L 47/12 (2013.01)

(58) Field of Classification Search
CPC .......... H04L 49/90; H04L 47/32; H04L 47/12
See application file for complete search history.

(56) References Cited

U.S. PATENT DOCUMENTS

| 9,875,188 B1 | 1/2018 | Egyed |
| 2006/0092837 A1* | 5/2006 | Kwan ..................... H04L 47/29 370/229 |
| 2007/0104102 A1 | 5/2007 | Opsasnick |
| 2007/0195777 A1 | 8/2007 | Tatar et al. |
| 2018/0063030 A1 | 3/2018 | Mitulal et al. |

FOREIGN PATENT DOCUMENTS

| CN | 106470126 A | 3/2017 |
| CN | 106789729 A | 5/2017 |
| CN | 107404443 A | 11/2017 |

* cited by examiner

Primary Examiner — Siming Liu
(74) Attorney, Agent, or Firm — Slater Matsil, LLP

(57) ABSTRACT

A packet processing method includes: a first device receives a packet from a second device; the first device determines a first queue buffer used to store the packet, and determines a first upper limit value of the first queue buffer based on an available value of a first port buffer and an available value of a global buffer, where the global buffer includes at least one port buffer, the first port buffer is one of the at least one port buffer, the first port buffer includes at least one queue buffer, and the first queue buffer is one of the at least one queue buffer. The first device processes the packet based on the first upper limit value of the first queue buffer, an occupation value of the first queue buffer, and a size of the packet.

18 Claims, 5 Drawing Sheets

PACKET PROCESSING METHOD AND APPARATUS, COMMUNICATIONS DEVICE, AND SWITCHING CIRCUIT

CROSS-REFERENCE TO RELATED APPLICATIONS

This application is a continuation of International Application No. PCT/CN2019/098050, filed on Jul. 27, 2019, which claims priority to Chinese Patent Application No. 201810912207.4, filed on Aug. 10, 2018. The disclosures of the aforementioned applications are hereby incorporated by reference in their entireties.

TECHNICAL FIELD

Embodiments of this application relate to the field of communications technologies, and in particular, to a packet processing method and apparatus, a communications device, and a switching circuit.

BACKGROUND

A shared buffer is a mainstream configuration parameter of an existing router, a switch forwarding chip (TM), and a switching network. Generally, the shared buffer is allocated and managed at a plurality of levels. A multi-level buffer may include a queue buffer, a port buffer, a global buffer, and the like in ascending order. The global buffer may include at least one port buffer, and the port buffer may include at least one queue buffer. When congestion occurs in a high-level buffer, regardless of whether congestion occurs in a low-level buffer, packets to be stored in the low-level buffer are discarded without differentiation. For example, when congestion occurs in the port buffer because of packets stored in a low-priority queue buffer 1, packets to be stored in a high-priority queue buffer 2 are discarded without differentiation.

Based on the foregoing congestion control manner, when excessive shared buffers are occupied because of congestion, a high-priority packet, a non-congestion-level packet, and the like are discarded without differentiation, and a bandwidth allocation error is further caused because a low-priority queue buffer preempts a bandwidth of a high-priority queue buffer, and bandwidth allocation in a same priority is unfair.

SUMMARY

Embodiments of this application provide a packet processing method and apparatus, a communications device, and a switching circuit, so as to avoid a bandwidth allocation function failure caused by undifferentiated discarding, and implement differentiated packet discarding.

According to a first aspect, an embodiment of this application provides a packet processing method, including: receiving, by a first device, a packet from a second device; determining, by the first device, a first queue buffer used to store the packet; determining, by the first device, a first upper limit value of the first queue buffer based on an available value of a first port buffer and an available value of a global buffer, where the global buffer includes at least one port buffer, the first port buffer is one of the at least one port buffer, the first port buffer includes at least one queue buffer, and the first queue buffer is one of the at least one queue buffer; and processing, by the first device, the packet based on the first upper limit value of the first queue buffer, an occupation value of the first queue buffer, and a size of the packet.

According to the packet processing method provided in the first aspect, the first device can dynamically determine a packet processing manner based on an upper limit value of a lowest-level buffer, an occupation value of the lowest-level buffer, and a size of a packet, so as to avoid a problem in an existing high-level buffer management manner that the first device discards, without differentiation, a packet to be input into a non-congested low-level buffer and a packet to be input into a congested low-level buffer, and discards, without differentiation, a packet to be input into a high-priority buffer and a packet to be input into a low-priority buffer, implement differentiated packet discarding, and resolve a prior-art problem of a bandwidth allocation function failure caused by undifferentiated packet discarding.

In a possible design, the determining, by the first device, a first upper limit value of the first queue buffer based on an available value of a first port buffer and an available value of a global buffer includes: determining, by the first device, the first upper limit value of the first queue buffer based on a port sharing upper limit value and a global sharing upper limit value, where the port sharing upper limit value is equal to a product of the available value of the first port buffer and a first coefficient, and the global sharing upper limit value is equal to a product of the available value of the global buffer and a second coefficient.

In a possible design, the determining, by the first device, the first upper limit value of the first queue buffer based on a port sharing upper limit value and a global sharing upper limit value includes: determining, by the first device, the first upper limit value of the first queue buffer based on the port sharing upper limit value, the global sharing upper limit value, and a preset lower limit value of the first queue buffer.

According to the packet processing method provided in this implementation, a process in which the first device can invoke a packet from a buffer at any level can be ensured, so as to protect buffers at all levels of the first device, and prevent the buffer at any level from being locked.

In a possible design, the method includes: determining, by the first device, the available value of the global buffer based on an upper limit value of the global buffer and an occupation value of the global buffer; determining, by the first device, an upper limit value of the first port buffer based on a third coefficient and the available value of the global buffer; and determining, by the first device, the available value of the first port buffer based on the upper limit value of the first port buffer and an occupation value of the first port buffer.

In a possible design, the processing, by the first device, the packet based on the first upper limit value of the first queue buffer, an occupation value of the first queue buffer, and a size of the packet includes: discarding, by the first device, the packet when a sum of the occupation value of the first queue buffer and the size of the packet is greater than the first upper limit value of the first queue buffer; or storing, by the first device, the packet in the first queue buffer when a sum of the occupation value of the first queue buffer and the size of the packet is less than or equal to the first upper limit value of the first queue buffer.

According to the packet processing method provided in this implementation, the first device can perform adaptive hierarchical waterline management on a shared buffer. The first device discards only a packet in a multi-level buffer at a level with a high occupation value, and does not discard a packet in a buffer at a level with a low occupation value, so as to avoid a problem in an existing high-level buffer management manner in which the first device discards, without differentiation, a packet to be input into a non-congested low-level buffer and a packet to be input into a congested low-level buffer, and discards, without differentiation, a packet to be input into a high-priority buffer and a packet to be input into a low-priority buffer, ensure invoking of the high-priority-level buffer, and prevent a packet to be input into the high-priority-level buffer from being discarded because of undifferentiated discarding.

In a possible design, the processing, by the first device, the packet based on the first upper limit value of the first queue buffer, an occupation value of the first queue buffer, and a size of the packet includes: when a sum of the occupation value of the first queue buffer and the size of the packet is greater than the first upper limit value of the first queue buffer, adding, by the first device, a congestion identifier to the packet, and storing, in the first queue buffer, the packet to which the congestion identifier is added, where the congestion identifier is used to indicate that the first queue buffer is in a congestion state; or storing, by the first device, the packet in the first queue buffer when a sum of the occupation value of the first queue buffer and the size of the packet is less than or equal to the first upper limit value of the first queue buffer.

According to the packet processing method provided in this implementation, the second device can reduce a size and a rate of a packet that is input into the first queue buffer, so that the first device performs differentiated marking on packets in a lossless service, neither a high-priority-level buffer nor a non-congestion-level buffer in the first device triggers a packet source end (the second device) to perform rate reduction when sending a packet, and rate reduction of the second device that is caused by undifferentiated marking by the first device is avoided.

In a possible design, the processing, by the first device, the packet based on the first upper limit value of the first queue buffer, an occupation value of the first queue buffer, and a size of the packet includes: when a sum of the occupation value of the first queue buffer and the size of the packet is greater than the first upper limit value of the first queue buffer, storing, by the first device, the packet in the first queue buffer, and sending a backpressure signal to the second device, where the backpressure signal is used to instruct the second device to stop sending a packet or stop sending a packet after sending at least one packet whose total size is a specific value; or storing, by the first device, the packet in the first queue buffer when a sum of the occupation value of the first queue buffer and the size of the packet is less than or equal to the first upper limit value of the first queue buffer.

According to the packet processing method provided in this implementation, the first device can perform differentiated backpressure indication on packets, so as to ensure a high throughput of a non-congestion-level buffer, avoid impact of a congestion-level buffer on a non-congestion-level buffer, and avoid throughput reduction caused by undifferentiated backpressure indication.

In a possible design, the method further includes: determining, by the first device, a second upper limit value of the first queue buffer based on the available value of the first port buffer and the available value of the global buffer, where the first upper limit value is greater than the second upper limit value; and the processing, by the first device, the packet based on the first upper limit value of the first queue buffer, an occupation value of the first queue buffer, and a size of the packet includes: discarding, by the first device, the packet when a sum of the occupation value of the first queue buffer and the size of the packet is greater than the first upper limit value of the first queue buffer; or storing, by the first device, the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choosing, by the first device based on a probability value, to discard the packet or store the packet in the first queue buffer.

According to the packet processing method provided in this implementation, the first device can perform adaptive hierarchical WRED management on a shared buffer. The first device is more likely to discard only a packet in a multi-level buffer at a level with a high occupation value, and is less likely to discard a packet that is input into a queue buffer with a low occupation value, so as to prevent a packet that is input into a high-priority-level buffer and a packet that is input into a non-congestion-level buffer from being discarded without differentiation because a low-priority buffer preempts for excessive shared buffers, and implement differentiated packet discarding.

In a possible design, the method further includes: determining, by the first device, a second upper limit value of the first queue buffer based on the available value of the first port buffer and the available value of the global buffer, where the first upper limit value is greater than the second upper limit value; and the processing, by the first device, the packet based on the first upper limit value of the first queue buffer, an occupation value of the first queue buffer, and a size of the packet includes: when a sum of the occupation value of the first queue buffer and the size of the packet is greater than the first upper limit value of the first queue buffer, adding, by the first device, a congestion identifier to the packet, and storing, in the first queue buffer, the packet to which the congestion identifier is added, where the congestion identifier is used to indicate that the first queue buffer is in a congestion state; or storing, by the first device, the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choosing, by the first device based on a probability value, to store the packet in the first queue buffer or add a congestion identifier to the packet and store, in the first queue buffer, the packet to which the congestion identifier is added.

According to the packet processing method provided in this implementation, the second device can reduce a size and a rate of a packet that is input into the first queue buffer, so that the first device performs differentiated packet marking, neither a high-priority-level buffer nor a non-congestion-level buffer in the first device triggers a packet source end (the second device) to perform rate reduction when sending a packet, and rate reduction caused by undifferentiated marking by the first device is avoided.

According to a second aspect, an embodiment of this application provides a communications device, including an interface unit, a processing unit, and a memory.

The interface unit is configured to receive a packet from another communications device.

The processing unit is configured to determine a first queue buffer used to store the packet.

The processing unit is further configured to determine a first upper limit value of the first queue buffer based on an available value of a first port buffer and an available value of a global buffer.

The memory includes the global buffer, where the global buffer includes at least one port buffer, the first port buffer is one of the at least one port buffer, the first port buffer includes at least one queue buffer, and the first queue buffer is one of the at least one queue buffer.

The processing unit is further configured to process the packet based on the first upper limit value of the first queue buffer, an occupation value of the first queue buffer, and a size of the packet.

In a possible design, the processing unit is configured to determine the first upper limit value of the first queue buffer based on a port sharing upper limit value and a global sharing upper limit value, where the port sharing upper limit value is equal to a product of the available value of the first port buffer and a first coefficient, and the global sharing upper limit value is equal to a product of the available value of the global buffer and a second coefficient.

In a possible design, the processing unit is configured to determine the first upper limit value of the first queue buffer based on the port sharing upper limit value, the global sharing upper limit value, and a preset lower limit value of the first queue buffer.

In a possible design, the processing unit is specifically configured to: determine the available value of the global buffer based on an upper limit value of the global buffer and an occupation value of the global buffer; determine an upper limit value of the first port buffer based on a third coefficient and the available value of the global buffer; and determine the available value of the first port buffer based on the upper limit value of the first port buffer and an occupation value of the first port buffer.

In a possible design, the processing unit is specifically configured to: discard the packet when a sum of the occupation value of the first queue buffer and the size of the packet is greater than the first upper limit value of the first queue buffer; or store the packet in the first queue buffer when a sum of the occupation value of the first queue buffer and the size of the packet is less than or equal to the first upper limit value of the first queue buffer.

In a possible design, the processing unit is specifically configured to: when a sum of the occupation value of the first queue buffer and the size of the packet is greater than the first upper limit value of the first queue buffer, add a congestion identifier to the packet, and store, in the first queue buffer, the packet to which the congestion identifier is added, where the congestion identifier is used to indicate that the first queue buffer is in a congestion state; or store the packet in the first queue buffer when a sum of the occupation value of the first queue buffer and the size of the packet is less than or equal to the first upper limit value of the first queue buffer.

In a possible design, the processing unit is specifically configured to: when a sum of the occupation value of the first queue buffer and the size of the packet is greater than the first upper limit value of the first queue buffer, store the packet in the first queue buffer, and send an indication signal to the interface unit; or store the packet in the first queue buffer when a sum of the occupation value of the first queue buffer and the size of the packet is less than or equal to the first upper limit value of the first queue buffer.

In a possible design, the interface unit is further configured to send a backpressure signal to the another communications device when receiving the indication signal, where the backpressure signal is used to instruct the another communications device to stop sending a packet or stop sending a packet after sending at least one packet whose total size is a specific value.

In a possible design, the processing unit is further configured to determine a second upper limit value of the first queue buffer based on the available value of the first port buffer and the available value of the global buffer, where the first upper limit value is greater than the second upper limit value; and the processing unit is specifically configured to: discard the packet when a sum of the occupation value of the first queue buffer and the size of the packet is greater than the first upper limit value of the first queue buffer; or store the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choose, based on a probability value, to discard the packet or store the packet in the first queue buffer.

In a possible design, the processing unit is further configured to determine a second upper limit value of the first queue buffer based on the available value of the first port buffer and the available value of the global buffer, where the first upper limit value is greater than the second upper limit value; and the processing unit is specifically configured to: when a sum of the occupation value of the first queue buffer and the size of the packet is greater than the first upper limit value of the first queue buffer, add a congestion identifier to the packet, and store, in the first queue buffer, the packet to which the congestion identifier is added, where the congestion identifier is used to indicate that the first queue buffer is in a congestion state; or store the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choose, based on a probability value, to store the packet in the first queue buffer or add a congestion identifier to the packet and store, in the first queue buffer, the packet to which the congestion identifier is added.

According to a third aspect, an embodiment of this application provides a switching circuit, including a processing unit and a memory.

The processing unit is configured to receive a packet from another device.

The processing unit is further configured to determine a first queue buffer used to store the packet.

The processing unit is further configured to determine a first upper limit value of the first queue buffer based on an available value of a first port buffer and an available value of a global buffer.

The memory includes the global buffer, where the global buffer includes at least one port buffer, the first port buffer is one of the at least one port buffer, the first port buffer includes at least one queue buffer, and the first queue buffer is one of the at least one queue buffer.

The processing unit is further configured to process the packet based on the first upper limit value of the first queue buffer, an occupation value of the first queue buffer, and a size of the packet.

In a possible design, the processing unit is configured to determine the first upper limit value of the first queue buffer based on a port sharing upper limit value and a global sharing upper limit value, where the port sharing upper limit value is equal to a product of the available value of the first port buffer and a first coefficient, and the global sharing upper limit value is equal to a product of the available value of the global buffer and a second coefficient.

In a possible design, the processing unit is configured to determine the first upper limit value of the first queue buffer based on the port sharing upper limit value, the global sharing upper limit value, and a preset lower limit value of the first queue buffer.

In a possible design, the processing unit is configured to: determine the available value of the global buffer based on an upper limit value of the global buffer and an occupation value of the global buffer; determine an upper limit value of the first port buffer based on a third coefficient and the available value of the global buffer; and determine the available value of the first port buffer based on the upper limit value of the first port buffer and an occupation value of the first port buffer.

In a possible design, the processing unit is specifically configured to: when a sum of the occupation value of the first queue buffer and the size of the packet is greater than the first upper limit value of the first queue buffer, store the packet in the first queue buffer, and send an indication signal, where the indication signal is used to indicate that the first queue buffer is in a congestion state; or store the packet in the first queue buffer when a sum of the occupation value of the first queue buffer and the size of the packet is less than or equal to the first upper limit value of the first queue buffer.

In a possible design, the processing unit is specifically configured to: when a sum of the occupation value of the first queue buffer and the size of the packet is greater than the first upper limit value of the first queue buffer, add a congestion identifier to the packet, and store, in the first queue buffer, the packet to which the congestion identifier is added, where the congestion identifier is used to indicate that the first queue buffer is in a congestion state; or store the packet in the first queue buffer when a sum of the occupation value of the first queue buffer and the size of the packet is less than or equal to the first upper limit value of the first queue buffer.

In a possible design, the processing unit is specifically configured to: when a sum of the occupation value of the first queue buffer and the size of the packet is greater than the first upper limit value of the first queue buffer, store the packet in the first queue buffer, and send an indication signal, where the indication signal is used to indicate that the first queue buffer is in a congestion state; or store the packet in the first queue buffer when a sum of the occupation value of the first queue buffer and the size of the packet is less than or equal to the first upper limit value of the first queue buffer.

In a possible design, the processing unit is further configured to determine a second upper limit value of the first queue buffer based on the available value of the first port buffer and the available value of the global buffer, where the first upper limit value is greater than the second upper limit value; and the processing unit is specifically configured to: discard the packet when a sum of the occupation value of the first queue buffer and the size of the packet is greater than the first upper limit value of the first queue buffer; or store the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choose, based on a probability value, to discard the packet or store the packet in the first queue buffer.

In a possible design, the processing unit is further configured to determine a second upper limit value of the first queue buffer based on the available value of the first port buffer and the available value of the global buffer, where the first upper limit value is greater than the second upper limit value; and the processing unit is specifically configured to: when a sum of the occupation value of the first queue buffer and the size of the packet is greater than the first upper limit value of the first queue buffer, add a congestion identifier to the packet, and store, in the first queue buffer, the packet to which the congestion identifier is added, where the congestion identifier is used to indicate that the first queue buffer is in a congestion state; or store the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choose, based on a probability value, to store the packet in the first queue buffer or add a congestion identifier to the packet and store, in the first queue buffer, the packet to which the congestion identifier is added.

According to a fourth aspect, an embodiment of this application provides a first device, including: a receiving module, configured to receive a packet from a second device; a determining module, configured to determine a first queue buffer used to store the packet, where the determining module is configured to determine a first upper limit value of the first queue buffer based on an available value of a first port buffer and an available value of a global buffer, where the global buffer includes at least one port buffer, the first port buffer is one of the at least one port buffer, the first port buffer includes at least one queue buffer, and the first queue buffer is one of the at least one queue buffer; and a processing module, configured to process the packet based on the first upper limit value of the first queue buffer, an occupation value of the first queue buffer, and a size of the packet.

In a possible design, the determining module is specifically configured to determine the first upper limit value of the first queue buffer based on a port sharing upper limit value and a global sharing upper limit value, where the port sharing upper limit value is equal to a product of the available value of the first port buffer and a first coefficient, and the global sharing upper limit value is equal to a product of the available value of the global buffer and a second coefficient.

In a possible design, the determining module is specifically configured to determine the first upper limit value of the first queue buffer based on the port sharing upper limit value, the global sharing upper limit value, and a preset lower limit value of the first queue buffer.

In a possible design, the determining module is specifically configured to: determine the available value of the global buffer based on an upper limit value of the global buffer and an occupation value of the global buffer; determine an upper limit value of the first port buffer based on a third coefficient and the available value of the global buffer; and determine the available value of the first port buffer based on the upper limit value of the first port buffer and an occupation value of the first port buffer.

In a possible design, the processing module is specifically configured to: discard the packet when a sum of the occupation value of the first queue buffer and the size of the packet is greater than the first upper limit value of the first queue buffer; or store the packet in the first queue buffer when a sum of the occupation value of the first queue buffer and the size of the packet is less than or equal to the first upper limit value of the first queue buffer.

In a possible design, the processing module is specifically configured to: when a sum of the occupation value of the first queue buffer and the size of the packet is greater than the first upper limit value of the first queue buffer, add a congestion identifier to the packet, and store, in the first queue buffer, the packet to which the congestion identifier is added, where the congestion identifier is used to indicate that the first queue buffer is in a congestion state; or store the packet in the first queue buffer when a sum of the occupation value of the first queue buffer and the size of the packet is less than or equal to the first upper limit value of the first queue buffer.

In a possible design, the processing module is specifically configured to: when a sum of the occupation value of the first queue buffer and the size of the packet is greater than the first upper limit value of the first queue buffer, store the packet in the first queue buffer, and send a backpressure signal to the second device, where the backpressure signal is used to instruct the second device to stop sending a packet or stop sending a packet after sending at least one packet whose total size is a specific value; or store the packet in the first queue buffer when a sum of the occupation value of the first queue buffer and the size of the packet is less than or equal to the first upper limit value of the first queue buffer.

In a possible design, the determining module is specifically configured to determine a second upper limit value of the first queue buffer based on the available value of the first port buffer and the available value of the global buffer, where the first upper limit value is greater than the second upper limit value; and the processing module is specifically configured to: discard the packet when a sum of the occupation value of the first queue buffer and the size of the packet is greater than the first upper limit value of the first queue buffer; or store the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choose, based on a probability value, to discard the packet or store the packet in the first queue buffer.

In a possible design, the determining module is specifically configured to determine a second upper limit value of the first queue buffer based on the available value of the first port buffer and the available value of the global buffer, where the first upper limit value is greater than the second upper limit value; and the processing module is specifically configured to: when a sum of the occupation value of the first queue buffer and the size of the packet is greater than the first upper limit value of the first queue buffer, add a congestion identifier to the packet, and store, in the first queue buffer, the packet to which the congestion identifier is added, where the congestion identifier is used to indicate that the first queue buffer is in a congestion state; or store the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choose, based on a probability value, to store the packet in the first queue buffer or add a congestion identifier to the packet and store, in the first queue buffer, the packet to which the congestion identifier is added.

According to a fifth aspect, an embodiment of this application provides a first device, including a memory and a processor. The memory is configured to store a program instruction, and the processor is configured to invoke the program instruction in the memory to perform the packet processing method in the first aspect.

According to a sixth aspect, an embodiment of this application provides a readable storage medium. The readable storage medium stores a computer program, and when the computer program is executed, the communication method in the first aspect of the embodiments of this application is implemented.

According to the packet processing method and apparatus, the communications device, and the switching circuit that are provided in the embodiments of this application, the first device determines, based on the packet sent by the second device, the first queue buffer used to store the packet, determines the first upper limit value of the first queue buffer based on the available value of the first port buffer and the available value of the global buffer, and processes the packet based on the first upper limit value of the first queue buffer, the occupation value of the first queue buffer, and the size of the packet. Compared with the prior art in which an occupation value of a buffer at each level and a fixed discarding waterline of the buffer at each level need to be compared, and consequently undifferentiated packet discarding is easily caused, in the embodiments of this application, an upper limit value of a lowest-level buffer not only fully considers impact of current availability statuses of buffers at other levels than the lowest-level buffer on the upper limit value of the lowest-level buffer, but also can be adaptively adjusted based on available values of the buffers at other levels in a current state. The upper limit value of the lowest-level buffer is not fixed, but keeps changing dynamically, so that the first device can dynamically determine a packet processing manner, to be specific, discards only a packet that is input into a buffer at a multi-level with a high buffer occupation, and does not discard a packet that is input into a buffer at a level with a low buffer occupation, thereby preventing a low-priority buffer from preempting for excessive shared buffers, avoiding a problem in an existing high-level buffer management manner that the first device discards, without differentiation, a packet to be input into a non-congested low-level buffer and a packet to be input into a congested low-level buffer, and discards, without differentiation, a packet to be input into a high-priority buffer and a packet to be input into a low-priority buffer, implementing differentiated packet discarding, and resolving a problem of a bandwidth allocation function failure caused by undifferentiated packet discarding.

DETAILED DESCRIPTION OF ILLUSTRATIVE EMBODIMENTS

Figure 1:
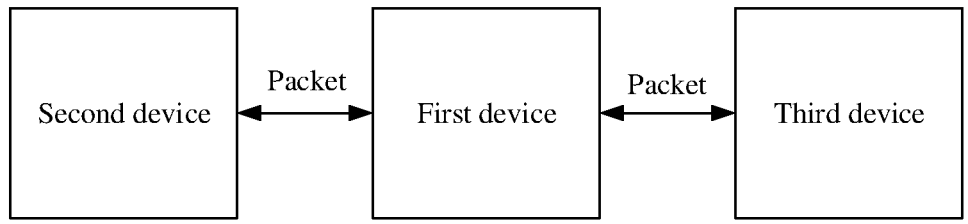
FIG. 1 is a schematic diagram of a communications system according to an embodiment of this application.

FIG. 1 is a schematic diagram of a communications system according to an embodiment of this application. As shown in FIG. 1, the communications system includes a first device and a second device. When receiving a packet sent by the second device, the first device may determine, based on a specific status of a buffer of the first device, whether to discard or store the packet. As shown in FIG. 1, the communications system may further include a third device. After storing the received packet, the first device may send the received packet to the third device.

The first device mentioned in this embodiment of this application may be any physical device or virtual device that has a packet processing function, for example, a switch or a router. The second device mentioned in this embodiment of this application may be any physical device or virtual device that has a packet sending function. The third device mentioned in this embodiment of this application may be any physical device or virtual device that has a packet receiving function.

The first device may be a switch or a router. For example, the first device may include a port module, an ingress packet processing (Ingress PP) module, an egress packet processing (Egress PP) module, an active queue management (AQM) module, a scheduler, a queue management module, and a packet buffer (PB). The queue management module includes an enqueuing (ENQ) module and a dequeuing (DEQ) module.

Specifically, the packet sent by the second device may enter the ingress PP module through the port module. After performing ingress packet processing (for example, an operation such as searching a forwarding table) on the packet, the ingress PP module adds egress information to the packet. The egress information includes, for example, information such as an identifier of a queue buffer. The ingress PP module sends the packet to the AQM module. The AQM module outputs the packet to the ENQ module for enqueuing. The ENQ module reports the information to the scheduler and stores the packet in the PB. Then, the scheduler may notify the DEQ module to extract the packet from the PB and send the packet to the egress PP module. After performing egress packet processing (for example, an operation such as encapsulation or decapsulation) on the packet, the egress PP module sends the packet to the third device through the port module.

The first device may include a switching chip. The switching chip is, for example, a switch buffer (SWB) chip or a queue manager (TM) chip. The AQM module, the scheduler, the queue management module, and the packet buffer may be included in the switching chip.

The packet buffer in the first device may be used as a shared buffer. Further, to fully use the shared buffer, the first device usually performs hierarchical management on the shared buffer from a plurality of levels, so that a capability of accommodating abruptly increasing packets is improved in a non-congestion case, and fair buffer allocation is implemented as much as possible in a congestion case. A quantity of buffer levels is not limited in this embodiment of this application. For example, a multi-level buffer may include a queue buffer, a port buffer, and a global buffer; or a queue buffer, a queue group buffer, and a port buffer; or a queue buffer, a port buffer, a port group buffer, and a global buffer; or a port buffer and a global buffer; or a port buffer, a port group buffer, and a global buffer. In the buffers at the foregoing levels, the queue buffer, the queue group buffer, the port buffer, the port group buffer, and the global buffer are ranked in ascending order of levels. For example, when the first device includes a queue buffer, a port buffer, and a global buffer, all or a part of the packet buffer is used as the global buffer, all or a part of the global buffer includes one or more port buffers, and all or a part of each port buffer includes one or more queue buffers. Therefore, after the first device stores the received packet in the queue buffer, the packet occupies a part of the queue buffer, a part of the port buffer including the queue buffer, and a part of the global buffer including the port buffer.

In a specific implementation of hierarchical management on a shared buffer, when the first device performs hierarchical waterline management on the shared buffer, the first device compares an occupation value of a buffer at each level with a discarding waterline of the buffer at each level. The discarding waterline is a threshold. When an occupation value of a buffer at any level exceeds a discarding waterline of the buffer at the level, the first device discards a received packet. When none of occupation values of buffers at all levels exceeds a discarding waterline, the first device stores a received packet. Therefore, when an occupation value of a high-level buffer exceeds a discarding waterline of the high-level buffer, even if an occupation value of a low-level buffer does not exceed a discarding waterline of the low-level buffer, the first device still discards a packet to be input into the low-level buffer, and consequently undifferentiated packet discarding is caused.

Figure 2:
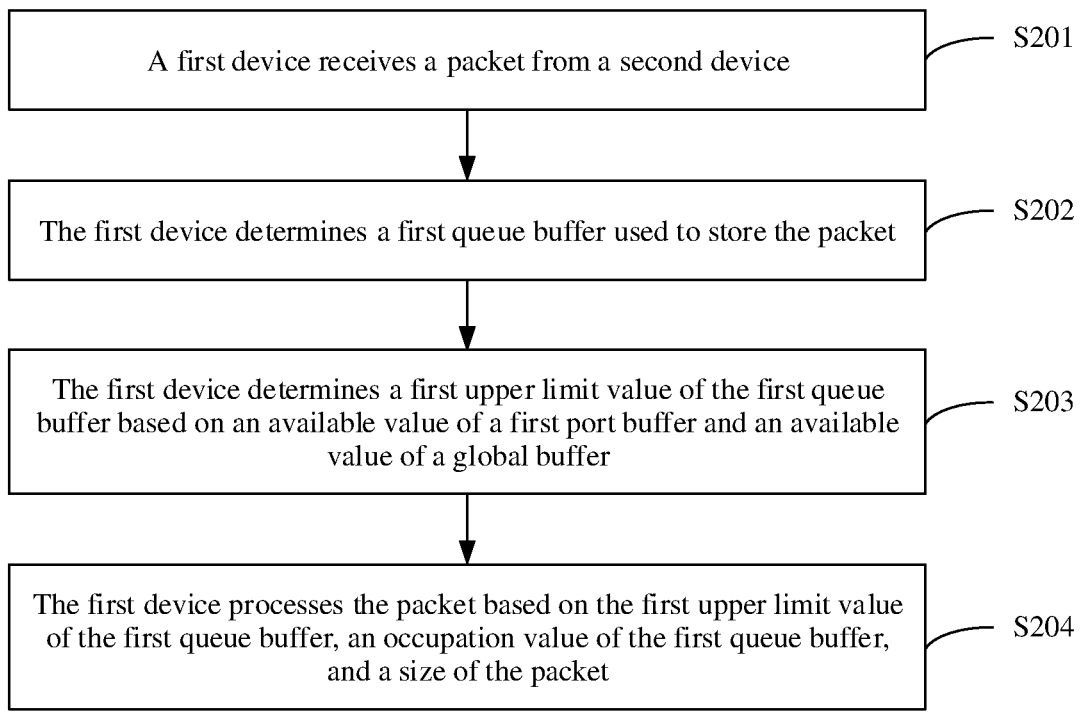
FIG. 2 is a flowchart of a packet processing method according to an embodiment of this application.

Embodiments of this application provide a packet processing method and apparatus, a communications device, and a switching circuit, so as to implement differentiated discarding, and resolve a prior-art problem of undifferentiated packet discarding caused by improper management on a shared buffer. With reference to FIG. 2, the following describes in detail a specific implementation process of the packet processing method in the embodiments of this application by using an example in which a first device is an execution body, and buffers at all levels in the first device include a queue buffer, a port buffer, and a global buffer in ascending order.

FIG. 2 is a flowchart of a packet processing method according to an embodiment of this application. As shown in FIG. 2, the packet processing method in this embodiment of this application may include the following steps.

S201. A first device receives a packet from a second device.

S202. The first device determines a first queue buffer used to store the packet.

In this embodiment of this application, when receiving the packet sent by the second device, the first device does not immediately store the packet. Because a lowest-level buffer in buffers at all levels in the first device is a queue buffer, the first device may determine, based on the packet, the first queue buffer used to store the packet. After receiving the packet sent by the second device, the first device may determine, based on a destination address, a priority, or other information of the packet, a queue buffer corresponding to the packet, to store packets having different destination addresses, priorities, or other information in different queue buffers. The first device may add, to a packet, information used to identify a queue buffer corresponding to the packet. The information used to identify the queue buffer may include a queue identifier, and packets stored in a same queue buffer have a same queue identifier. The information used to identify the queue buffer may alternatively include a priority identifier, and packets stored in a same queue buffer have a same priority identifier. Packets having a same priority identifier belong to a same priority group.

S203. The first device determines a first upper limit value of the first queue buffer based on an available value of a first port buffer and an available value of a global buffer, where the global buffer includes at least one port buffer, the first port buffer is one of the at least one port buffer, the first port buffer includes at least one queue buffer, and the first queue buffer is one of the at least one queue buffer.

A sum of sizes of all packets included in a buffer at any level is an occupation value of the buffer, a maximum value of a sum of sizes of packets that can be stored in the buffer is an upper limit value of the buffer, and a value obtained by subtracting the occupation value of the buffer from the upper limit value of the buffer is an available value of the buffer. The foregoing buffer is, for example, a port buffer, a queue buffer, or a global buffer.

Further, the first device may obtain the available value of the first port buffer and the available value of the global buffer in a current state, and determine the first upper limit value of the first queue buffer based on the two available values. When at least one of the available value of the first port buffer and/or the available value of the global buffer changes, the first upper limit value of the first queue buffer changes accordingly.

Specific structures of the global buffer and the first port buffer are not limited in this embodiment of this application. The global buffer may include only the first port buffer, or the global buffer may include a plurality of port buffers including the first port buffer. The first port buffer may include only the first queue buffer, or the first port buffer may include a plurality of queue buffers including the first queue buffer.

S204. The first device processes the packet based on the first upper limit value of the first queue buffer, an occupation value of the first queue buffer, and a size of the packet.

In this embodiment of this application, the first device may further obtain the occupation value of the first queue buffer in a current state, and obtain the size of the packet through calculation. The size of the packet is a memory size occupied by packet data, and a cell or a quantity of bytes may be used as a measurement unit of the size of the packet. Because the first upper limit value of the first queue buffer considers impact of current usage of the first port buffer and the global buffer on the first upper limit value of the first queue buffer, the first device may directly determine a specific packet processing manner based on the first upper limit value of the first queue buffer, the occupation value of the first queue buffer, and the size of the packet, and does not need to consider whether an occupation value of the global buffer exceeds a fixed discarding waterline of the global buffer and whether an occupation value of the first port buffer exceeds a fixed discarding waterline of the first port buffer. In addition, because the first upper limit value of the first queue buffer dynamically changes with the available value of the first port buffer and the available value of the global buffer, the first upper limit value is limited by the available value of the first port buffer and the available value of the global buffer. When the available value of the first port buffer and the available value of the global buffer decrease to specific values, the packet is restricted to entering the first queue buffer. Therefore, the first port buffer and the global buffer are not excessively occupied because a large quantity of packets enters the first queue buffer. This helps ensure an opportunity for another queue buffer to store a packet, and helps ensure that a packet that is input into a high-priority-level buffer and a packet that is input into a non-congestion-level buffer are not discarded without differentiation, so as to implement differentiated packet discarding.

It should be noted that, each time the first device receives a packet sent by the second device, the first device may re-determine a first queue buffer used to store the packet, and re-obtain an available value of the first port buffer, an available value of the global buffer, and an occupation value of the first queue buffer in this case, to obtain a specific packet processing manner based on the first upper limit value of the first queue buffer, the occupation value of the first queue buffer, and the size of the packet.

In this embodiment of this application, an upper limit value of a lowest-level buffer not only fully considers impact of current availability statuses of buffers at other levels than the lowest-level buffer on the upper limit value of the lowest-level buffer, but also can be adaptively adjusted based on available values of the buffers at other levels in a current state. The upper limit value of the lowest-level buffer is not fixed, but keeps changing dynamically, so that the first device can dynamically determine a packet processing manner, to be specific, discard only a packet that is input into a buffer at a multi-level with a high buffer occupation, and does not discard a packet that is input into a buffer at a level with a low buffer occupation, thereby preventing a low-priority buffer from preempting for excessive shared buffers, avoiding a problem in an existing high-level buffer management manner that the first device discards, without differentiation, a packet to be input into a non-congested low-level buffer and a packet to be input into a congested low-level buffer, and discards, without differentiation, a packet to be input into a high-priority buffer and a packet to be input into a low-priority buffer, implementing differentiated packet discarding, and resolving a problem of a bandwidth allocation function failure caused by undifferentiated packet discarding.

For example, based on the embodiment shown in FIG. 2, in a specific implementation of S203, the first device determines the first upper limit value of the first queue buffer based on a port sharing upper limit value and a global sharing upper limit value. The port sharing upper limit value is equal to a product of the available value of the first port buffer and a first coefficient, and the global sharing upper limit value is equal to a product of the available value of the global buffer and a second coefficient.

The first device may obtain the port sharing upper limit value according to a formula 1.

$$\text{QueueLimitPort}_{i,j} = \gamma_{i,j} \times \text{RemainPort}_i \qquad \text{Formula 1.}$$

Herein, QueueLimitPort$_{i,j}$ is a port sharing upper limit value used to calculate an upper limit value of a j$^{th}$ queue buffer in an i$^{th}$ port buffer in the global buffer, a value range of the first coefficient $\gamma_{i,j}$ is, for example, 1/128 to 8, and RemainPort$_i$ is an available value of the i$^{th}$ port buffer.

In this embodiment of this application, a subscript i indicates an i$^{th}$ port buffer, and a subscript j indicates a j$^{th}$ queue buffer. In this embodiment of this application, it is assumed that the first port buffer is the i$^{th}$ port buffer in the global buffer, and the first queue buffer is the j$^{th}$ queue buffer in the i$^{th}$ port buffer.

The first device may obtain the global sharing upper limit value according to a formula 2.

$$\text{QueueLimitGlobal}_{i,j} = \alpha_{i,j} \times \text{RemainGlobal} \quad \text{Formula 2.}$$

Herein, QueueLimitGlobal$_{i,j}$ is a global sharing upper limit value used to calculate the upper limit value of the j$^{th}$ queue buffer in the i$^{th}$ port buffer in the global buffer, a value range of the second coefficient $\alpha_{i,j}$ is, for example, 1/128 to 8, and RemainGlobal is the available value of the global buffer.

Further, the first device may determine the first upper limit value of the first queue buffer based on the port sharing upper limit value and the global sharing upper limit value. Optionally, to avoid a case in which the first device cannot extract the packet from the first queue buffer because the determined first upper limit value of the first queue buffer is excessively small, the first device may set a preset lower limit value of the first queue buffer, so that the first device determines the first upper limit value of the first queue buffer based on the port sharing upper limit value, the global sharing upper limit value, and the preset lower limit value of the first queue buffer.

In this embodiment of this application, according to a formula 3, the first device may obtain a smaller value between the port sharing upper limit value and the global sharing upper limit value, obtain a larger value between the smaller value and the preset lower limit value of the first queue buffer, and use the larger value as the first upper limit value of the first queue buffer, so as to avoid a case in which the first device cannot extract the packet from the first queue buffer.

$$\text{QueueLimit}_{i,j} = \max(\min(\text{QueueLimitPort}_{i,j}, \text{QueueLimitGlobal}_{i,j}), \text{QueueMin}_{i,j}) \quad \text{Formula 3.}$$

Herein, QueueLimit$_{i,j}$ is the upper limit value of the j$^{th}$ queue buffer in the i$^{th}$ port buffer in the global buffer, that is, the first upper limit value of the first queue buffer, QueueLimitPort$_{i,j}$ is the port sharing upper limit value, QueueLimitGlobal$_{i,j}$ is the global sharing upper limit value, and QueueMin$_{i,j}$ is the preset lower limit value of the first queue buffer.

Based on the foregoing embodiment, because the queue buffer, the port buffer, and the global buffer are ranked in ascending order of levels, in addition to that an available value of the queue buffer is affected by the available value of the global buffer and an available value of the port buffer, the available value of the port buffer may be further affected by the available value of the global buffer. Therefore, in a specific implementation of determining the available value of the first port buffer, optionally, the first device may determine the available value of the global buffer according to a formula 4 based on an upper limit value of the global buffer and an occupation value of the global buffer. The first device determines an upper limit value of the first port buffer based on a third coefficient and the available value of the global buffer. The first device determines the available value of the first port buffer based on the upper limit value of the first port buffer and an occupation value of the first port buffer.

$$\begin{cases} \text{RemainGlobal} = \text{GlobalLimit} - \text{GlobalCnt} \\ \text{PortLimit}_i = \beta_i \times \text{RemainGlobal} \\ \text{RemainPort}_i = \text{PortLimit}_i - \text{PortCnt}_i \end{cases} \quad \text{Formula 4}$$

Herein, RemainGlobal is the available value of the global buffer, GlobalLimit is the upper limit value of the global buffer, GlobalCnt is the occupation value of the global buffer, PortLimit$_i$ is an upper limit value of the i$^{th}$ port buffer, a value range of the third coefficient $\beta_i$ is, for example, 1/128 to 8, RemainPort$_i$ is an available value of the i$^{th}$ port buffer, and PortCnt$_i$ is an occupation value of the i$^{th}$ port buffer.

Based on the embodiment shown in FIG. 2, when the first device performs hierarchical waterline management on the shared buffer, in a specific implementation of S204, when a sum of the occupation value of the first queue buffer and the size of the packet of the first device is greater than the first upper limit value of the first queue buffer, the first device discards the packet.

Alternatively, when a sum of the occupation value of the first queue buffer and the size of the packet is less than or equal to the first upper limit value of the first queue buffer, the first device stores the packet in the first queue buffer.

In this embodiment of this application, the first device does not need to consider whether the occupation value of the first port buffer exceeds a discarding waterline of the first port buffer and whether the occupation value of the global buffer exceeds a discarding waterline of the global buffer, and may determine, based on the first upper limit value of the first queue buffer, whether to discard or store the packet.

Specifically, when a sum of the occupation value of the first queue buffer and the size of the packet is greater than the first upper limit value of the first queue buffer, the first device discards the packet. Alternatively, when a sum of the occupation value of the first queue buffer and the size of the packet is less than the first upper limit value of the first queue buffer, the first device stores the packet in the first queue buffer. Alternatively, when a sum of the occupation value of the first queue buffer and the size of the packet is equal to the first upper limit value of the first queue buffer, the first device may discard the packet, or may store the packet in the first queue buffer. This is not limited in this embodiment of this application.

Further, once an occupation value of a high-level buffer is to reach an upper limit value of the high-level buffer, an upper limit value of a lowest-level buffer may be dynamically reduced, a lowest-level buffer that exceeds the upper limit value stops storing a packet, and lowest-level buffers with a same priority or different priorities that do not reach the upper limit value may still store packets. It means that these stored packets are stored in the high-level buffer. In this way, a case in which the first device discards a packet in a non-congestion buffer and a packet in a high-priority buffer without differentiation because a packet stored in a specific low-level buffer occupies excessive high-level buffers is avoided. The first coefficient and the second coefficient are used for the j$^{th}$ queue buffer in the i$^{th}$ port buffer, and other coefficients with different values may be used for other queue buffers. Therefore, a limitation relationship between a high-level buffer and a low-level buffer may be flexibly set, and different priorities of buffers at a same level are flexibly set. For example, compared with a low-priority buffer, a larger coefficient value is set for a high-priority buffer, so that the high-priority buffer has a larger upper limit value than the low-priority buffer. For ease of description, the following illustrates the foregoing process by using FIG. 3(a) and FIG. 3(b) as an example.

Figure 3:
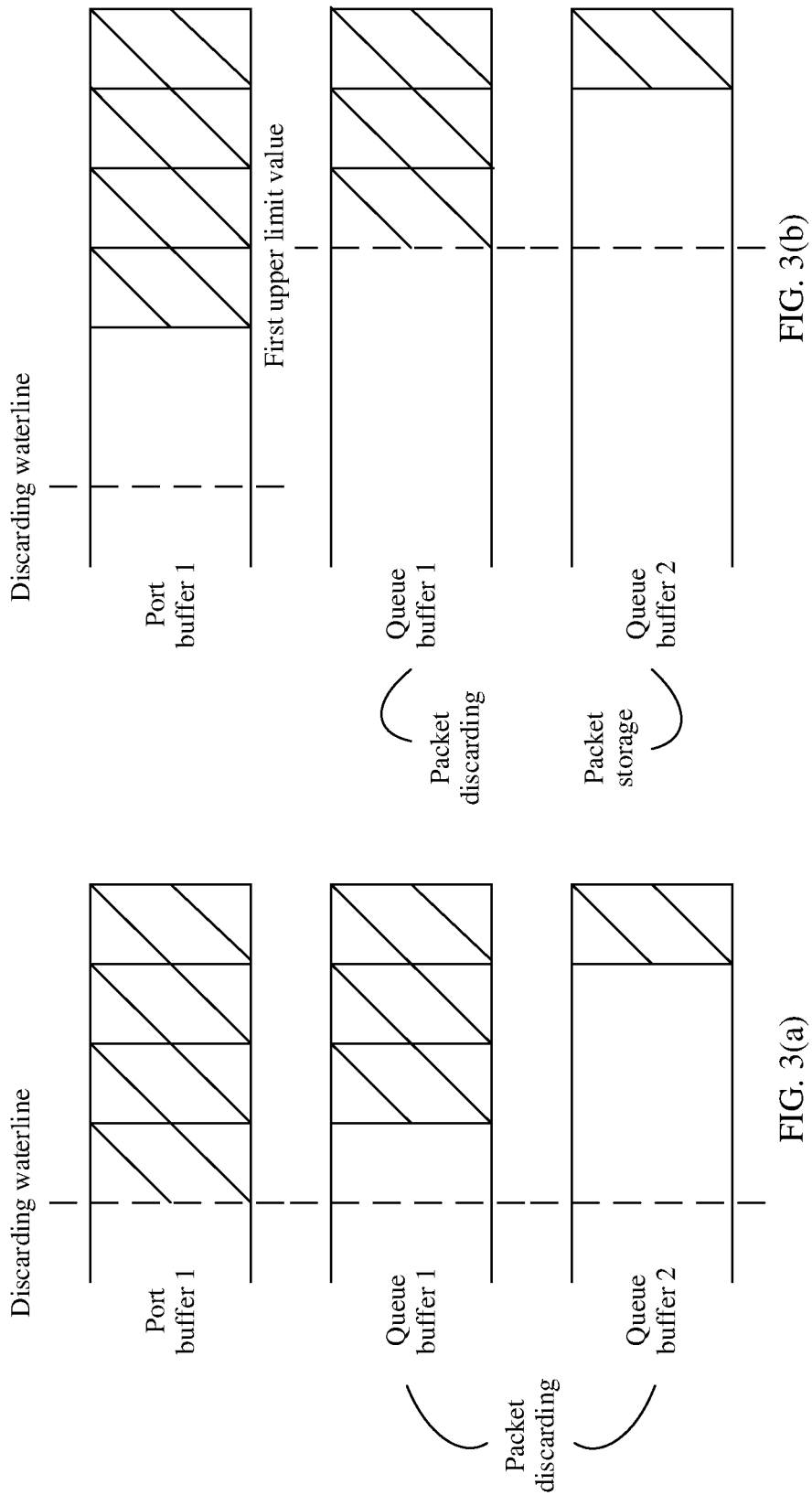
FIG. 3(a) and FIG. 3(b) are a schematic diagram of two-level hierarchical waterline management according to an embodiment of this application.

FIG. 3(a) and FIG. 3(b) are a schematic diagram of two-level hierarchical waterline management according to an embodiment of this application. As shown in FIG. 3, the first device includes a port buffer 1, and the port buffer 1 includes a queue buffer 1 and a queue buffer 2. The port buffer 1 is a high-level buffer, and the queue buffer 1 and the queue buffer 2 are low-level buffers. FIG. 3(a) corresponds to a specific implementation process in the prior art, and FIG. 3(b) corresponds to a specific implementation process in this embodiment of this application. In FIG. 3(a) and FIG. 3(b), a discarding waterline of the port buffer 1 is an upper limit value of the port buffer 1, a discarding waterline of the queue buffer 1 is an upper limit value of the queue buffer 1, and a discarding waterline of the queue buffer 2 is an upper limit value of the queue buffer 2.

As shown in FIG. 3(a), when an occupation value of the port buffer 1 exceeds the discarding waterline of the port buffer 1, because the port buffer 1 is a high-level buffer, the first device directly discards a packet that is input into the queue buffer 1 and a packet that is input into the queue buffer 2. As shown in FIG. 3(b), when an occupation value of the port buffer 1 is to reach the discarding waterline of the port buffer 1, the first device reduces a first upper limit value of the queue buffer 1 and a first upper limit value of the queue buffer 2. In this case, because an occupation value of the queue buffer 1 exceeds the current first upper limit value of the queue buffer 1, the first device discards the packet that is input into the queue buffer 1. Because an occupation value of the queue buffer 2 does not exceed the current first upper limit value of the queue buffer 2, the first device stores the packet that is input into the queue 2.

Further, the first device performs adaptive hierarchical waterline management on a shared buffer. The first device discards only a packet in a buffer at a multi-level with a high occupation value, and does not discard a packet in a buffer at a level with a low occupation value, so as to avoid a problem in an existing high-level buffer management manner in which the first device discards, without differentiation, a packet to be input into a non-congested low-level buffer and a packet to be input into a congested low-level buffer, and discards, without differentiation, a packet to be input into a high-priority buffer and a packet to be input into a low-priority buffer, implement differentiated discarding for buffers at a plurality of levels, ensure invoking of the high-priority-level buffer, and prevent a packet to be input into the high-priority-level buffer from being discarded because of undifferentiated discarding.

Based on the embodiment shown in FIG. 2, in another specific implementation of S204, when a sum of the occupation value of the first queue buffer and the size of the packet is greater than the first upper limit value of the first queue buffer, the first device adds a congestion identifier to the packet, and stores, in the first queue buffer, the packet to which the congestion identifier is added. The congestion identifier is used to indicate that the first queue buffer is in a congestion state.

Alternatively, when a sum of the occupation value of the first queue buffer and the size of the packet is less than or equal to the first upper limit value of the first queue buffer, the first device stores the packet in the first queue buffer. The congestion identifier is, for example, an explicit congestion notification (ECN) field in an internet protocol (IP) header of the packet.

In this embodiment of this application, based on the adaptive hierarchical waterline management performed by the first device on the shared buffer, the first device may determine, based on the first upper limit value of the first queue buffer, whether to add the congestion identifier, so as to avoid a phenomenon that a low-priority buffer preempts for excessive shared buffers, and consequently the first device still performs congestion marking on a packet when the packet is input into a high-priority buffer and a non-congestion buffer.

The congestion identifier is used to indicate that a current occupation value of the first queue buffer has reached the first upper limit value of the first queue buffer, and the first queue buffer is currently in a congestion state. When a sum of the occupation value of the first queue buffer and the size of the packet is equal to the first upper limit value of the first queue buffer, the first device may add a congestion identifier to the packet, and store, in the first queue buffer, the packet to which the congestion identifier is added, or may store the packet in the first queue buffer. This is not limited in this embodiment of this application.

Further, with reference to FIG. 1, when the communications system includes a third device, the first device may send, to the third device, the packet to which the congestion identifier is added. When receiving the packet to which the congestion identifier is added, the third device may send the packet including the congestion identifier to the second device through the first device. The congestion identifier is, for example, an ECN-echo (ECN-Echo, ECE) field in a transmission control protocol (TCP) header of the packet. The second device may learn, based on the congestion identifier, that the first queue buffer is in a congestion state, and the second device may further reduce a rate of sending a packet to the first device, so that the first device performs differentiated packet marking, neither a high-priority-level buffer nor a non-congestion-level buffer in the first device triggers a packet source end (the second device) to perform rate reduction when outputting a packet, and rate reduction caused by undifferentiated marking by the first device is avoided.

Based on the embodiment shown in FIG. 2, when the first device performs hierarchical waterline management on the shared buffer, in still another specific implementation of S204, when a sum of the occupation value of the first queue buffer and the size of the packet is greater than the first upper limit value of the first queue buffer, the first device stores the packet in the first queue buffer, and sends a backpressure signal to the second device. The backpressure signal is used to instruct the second device to stop sending a packet or stop sending a packet after sending at least one packet whose total size is a specific value.

Alternatively, when a sum of the occupation value of the first queue buffer and the size of the packet is less than or equal to the first upper limit value of the first queue buffer, the first device stores the packet in the first queue buffer.

The backpressure signal may instruct the second device to stop sending a packet by using a priority-based flow control mechanism. Alternatively, the backpressure signal may include a value, and is used to instruct the second device to stop sending a packet after sending at least one packet whose total size is the value to the first device by using a credit-based flow control mechanism.

In this embodiment of this application, based on the adaptive hierarchical waterline management performed by the first device on the shared buffer, the first device may determine, based on the first upper limit value of the first queue buffer, whether to send the backpressure signal to the second device, so as to perform differentiated backpressure indication on packets, and avoid a phenomenon that a low-priority buffer and/or a low-level buffer preempt and/or preempts for excessive shared buffers, and consequently the first device still sends the backpressure signal to the second device when packets are input into a high-priority buffer and a non-congestion buffer.

The backpressure signal is used to notify the second device that the current occupation value of the first queue buffer has exceeded the first upper limit value of the first queue buffer, and the first queue buffer is currently in a congestion state. When a sum of the occupation value of the first queue buffer and the size of the packet is equal to the first upper limit value of the first queue buffer, the first device may store the packet in the first queue buffer, and send the backpressure signal to the second device, or may store the packet in the first queue buffer. This is not limited in this embodiment of this application.

It should be noted that the first device may perform, through different modules, the two processes of receiving the packet and processing the packet. The first device may receive, through a port module in the first device, the packet sent by the second device, and process the packet through an AQM module in the first device. When the AQM module in the first device determines that a sum of the occupation value of the first queue buffer and the size of the packet is greater than the first upper limit value of the first queue buffer, the AQM module in the first device may send a trigger signal to the port module in the first device, and the port module in the first device may generate a backpressure signal based on the trigger signal, and send the backpressure signal to the second device.

In addition, the first device may further set a backpressure cancellation value of the first queue buffer by using a difference between the first upper limit value of the first queue buffer and a preset offset value of the first queue buffer. In this way, when a sum of the occupation value of the first queue buffer and the size of the packet is less than or equal to the backpressure cancellation value of the first queue buffer, the AQM module in the first device may send a trigger signal to the port module in the first device, and the port module in the first device may generate a backpressure cancellation signal based on the trigger signal, and send the backpressure cancellation signal to the second device, to instruct the second device to resume packet sending.

Based on the embodiment shown in FIG. 2, the first device may perform hierarchical weighted random early detection (WRED) management on the shared buffer. The first device may determine the first upper limit value and a second upper limit value of the first queue buffer based on the available value of the first port buffer and the available value of the global buffer. The second upper limit value is less than the first upper limit value. Further, the first device selects a packet processing manner based on a WRED algorithm, the first upper limit value, and the second upper limit value. The first device may alternatively use an RED algorithm, and a specific implementation process thereof is similar to that of the WRED algorithm. For details, refer to a specific implementation process of the WRED algorithm. Details are not described herein.

Figure 4:
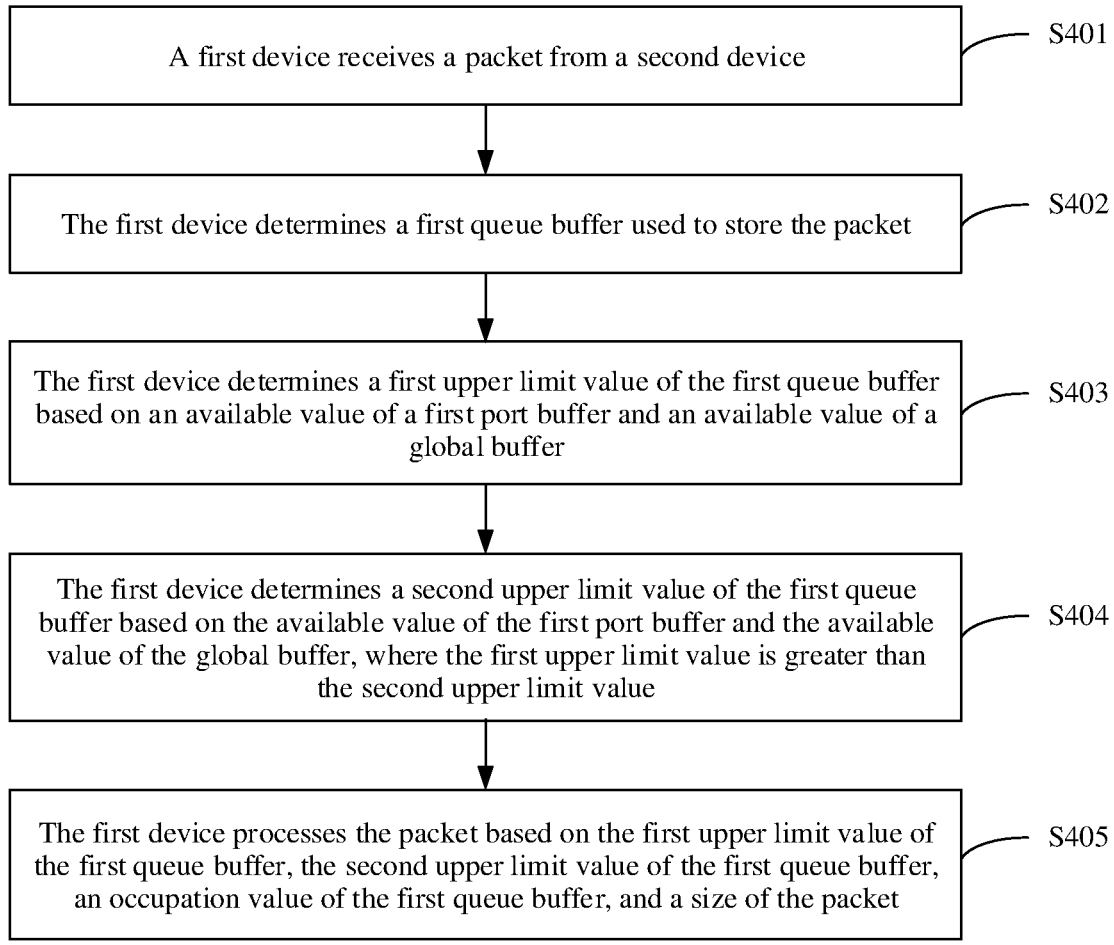
FIG. 4 is a schematic flowchart of a packet processing method according to an embodiment of this application.

The following describes in detail a specific implementation process of the packet processing manner with reference to FIG. 4. FIG. 4 is a schematic flowchart of a packet processing method according to an embodiment of this application. As shown in FIG. 4, the packet processing method in this embodiment of this application may include the following steps.

S401. A first device receives a packet from a second device.

S402. The first device determines a first queue buffer used to store the packet.

For specific implementation processes of S401 and S402, refer to related descriptions of 201 and S202 in the embodiment shown in FIG. 2. Details are not described herein again.

S403. The first device determines a first upper limit value of the first queue buffer based on an available value of a first port buffer and an available value of a global buffer, where the global buffer includes at least one port buffer, the first port buffer is one of the at least one port buffer, the first port buffer includes at least one queue buffer, and the first queue buffer is one of the at least one queue buffer; and S404. The first device determines a second upper limit value of the first queue buffer based on the available value of the first port buffer and the available value of the global buffer, where the first upper limit value is greater than the second upper limit value.

In this embodiment of this application, when performing hierarchical WRED management on a shared buffer, the first device calculates two thresholds used for a WRED algorithm, that is, a maximum WRED value and a minimum WRED value. The first device may separately determine the first upper limit value of the first queue buffer and the second upper limit value of the first queue buffer based on the available value of the first port buffer and the available value of the global buffer, and use the first upper limit value of the first queue buffer as the maximum WRED value, and use the second upper limit value of the first queue buffer as the minimum WRED value.

Specifically, as described in the foregoing embodiment, the first device may obtain the first upper limit value through calculation according to the formula 1, the formula 2, the formula 3, and the formula 4. In this embodiment, a maximum available value of the first queue buffer is obtained in the foregoing manner of calculating the first upper limit value. The first device may obtain the first upper limit value of the first queue buffer in the hierarchical WRED management according to a formula 5 based on a fourth coefficient, the maximum available value of the first queue buffer, and a preset lower limit value of the first queue buffer. The first device may obtain the second upper limit value of the first queue buffer in the hierarchical WRED management according to a formula 6 based on a fifth coefficient, the maximum available value of the first queue buffer, and the preset lower limit value of the first queue buffer.

$$\text{MIN\_TH}_{i,j} = \max(\text{MIN\_RATIO} \times \text{QueueLimit}_{i,j}, \text{QueueMin}_{i,j}) \quad \text{Formula 5.}$$

Herein, $\text{MIN\_TH}_{i,j}$ is a second upper limit value of a $j^{th}$ queue buffer in an $i^{th}$ port buffer in the global buffer in the hierarchical WRED management, the fourth coefficient MIN_RATIO is, for example, 10%, $\text{QueueLimit}_{i,j}$ is a second upper limit value of the $j^{th}$ queue buffer in the $i^{th}$ port buffer in the global buffer in hierarchical waterline management, and $\text{QueueMin}_{i,j}$ is a preset lower limit value of the $j^{th}$ queue buffer in the $i^{th}$ port buffer in the global buffer in the hierarchical waterline management.

$$\text{MAX\_TH}_{i,j} = \max(\text{MAX\_RATIO} \times \text{QueueLimit}_{i,j}, \text{QueueMin}_{i,j}) \quad \text{Formula 6.}$$

Herein, $\text{MAX\_TH}_{i,j}$ is a first upper limit value of the $j^{th}$ queue buffer in the $i^{th}$ port buffer in the global buffer in the hierarchical WRED management, and the fifth coefficient MAX_RATIO is greater than MIN_TH$_{i,j}$, for example, 50%, 70%, or 100%.

S405. The first device processes the packet based on the first upper limit value of the first queue buffer, an occupation value of the first queue buffer, and a size of the packet.

The first upper limit value and the second upper limit value that are of the first queue buffer and that are obtained in S404 fully consider impact of current usage of the first port buffer and the global buffer on the first upper limit value and the second upper limit value. Therefore, the first device may determine a specific packet processing manner based on the first upper limit value of the first queue buffer, the second upper limit value of the first queue buffer, the occupation value of the first queue buffer, and the size of the packet, and does not need to consider discarding probabilities of the global buffer and the first port buffer. The first upper limit value of the first queue buffer and the second upper limit value of the first queue buffer dynamically change with the available value of the first port buffer and the available value of the global buffer. Therefore, the first device is more likely to discard only a packet that is input into a queue buffer with a high occupation value, and is less likely to discard a packet that is input into a queue buffer with a low occupation value, so as to prevent a packet that is input into a high-priority-level buffer and a packet that is input into a non-congestion-level buffer from being discarded without differentiation because a low-priority buffer preempts for excessive shared buffers, and implement differentiated packet discarding.

Based on the embodiment shown in FIG. 4, when the first device performs hierarchical WRED management on the shared buffer, in a specific implementation of S405, when a sum of the occupation value of the first queue buffer and the size of the packet of the first device is greater than the first upper limit value of the first queue buffer, the first device discards the packet.

Alternatively, when a sum of the occupation value of the first queue buffer and the size of the packet is less than the second upper limit value of the first queue buffer, the first device stores the packet in the first queue buffer.

Alternatively, when a sum of the occupation value of the first queue buffer and the size of the packet is greater than the second upper limit value of the first queue buffer and is less than the first upper limit value of the first queue buffer, the first device chooses, based on a probability value, to discard the packet or store the packet in the first queue buffer. For example, the probability value is 70%. If the first device processes the packet for 1000 times, the first device selects a discarding operation for about 700 times and discards the packet, and selects a storage operation for about 300 times and stores the packet in the first queue buffer.

The first device may obtain the probability value through calculation based on the WRED algorithm, the first upper limit value of the first queue buffer, the second upper limit value of the first queue buffer, and the sum of the occupation value of the first queue buffer and the size of the packet. When the probability value is between the first upper limit value and the second upper limit value, that the sum of the occupation value of the first queue buffer and the size of the packet is closer to the first upper limit value indicates a larger probability value, and a higher probability of discarding the packet, that is, a lower probability of storing the packet. When the probability value is between the first upper limit value and the second upper limit value, that the sum of the occupation value of the first queue buffer and the size of the packet is closer to the second upper limit value indicates a smaller probability value, and a higher probability of storing the packet, that is, a lower probability of discarding the packet.

Based on the embodiment shown in FIG. 4, in another specific implementation of S405, when a sum of the occupation value of the first queue buffer and the size of the packet is greater than the first upper limit value of the first queue buffer, the first device adds a congestion identifier to the packet, and stores, in the first queue buffer, the packet to which the congestion identifier is added. The congestion identifier is used to indicate that the first queue buffer is in a congestion state.

Alternatively, when a sum of the occupation value of the first queue buffer and the size of the packet is less than the second upper limit value of the first queue buffer, the first device stores the packet in the first queue buffer.

Alternatively, when a sum of the occupation value of the first queue buffer and the size of the packet is greater than the second upper limit value of the first queue buffer and is less than the first upper limit value of the first queue buffer, the first device chooses, based on a probability value, to store the packet in the first queue buffer or add a congestion identifier to the packet and store, in the first queue buffer, the packet to which the congestion identifier is added. For example, the probability value is 70%. If the first device processes the packet for 1000 times, the first device selects, for about 700 times, an operation of storing, in the first queue buffer, the packet to which the congestion identifier is added, and directly chooses, for about 300 times, to store, in the first queue buffer, the packet to which the congestion identifier is not added. For calculation of the probability value, refer to the previous specific implementation of S405. When the probability value is between the first upper limit value and the second upper limit value, that the sum of the occupation value of the first queue buffer and the size of the packet is closer to the first upper limit value indicates a larger probability value, and a higher probability of adding the congestion identifier to the packet, and that the sum of the occupation value of the first queue buffer and the size of the packet is closer to the second upper limit value indicates a smaller probability value, and a lower probability of adding the congestion identifier to the packet.

Further, referring to the foregoing description content that the first device sends the packet to which the congestion identifier is added to the third device, the second device may subsequently reduce a rate of sending a packet to the first device, so that the first device performs differentiated packet marking.

Figure 5:
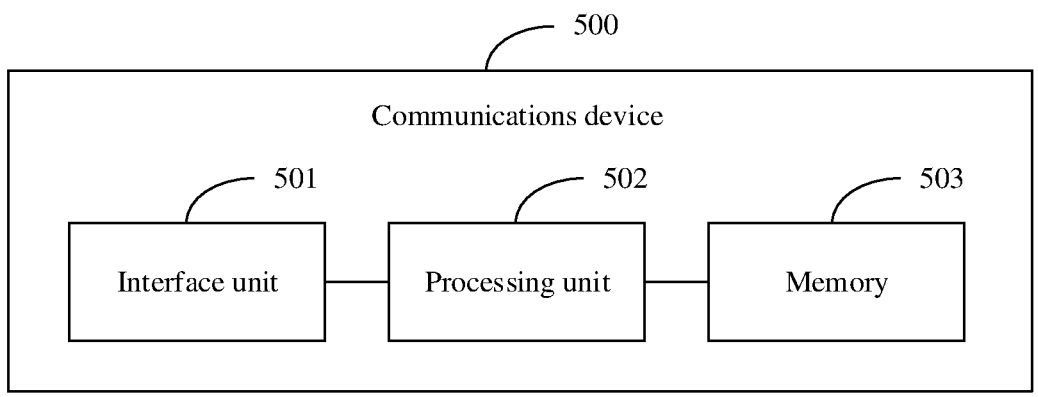
FIG. 5 is a schematic structural diagram of a communications device according to an embodiment of this application.

For example, an embodiment of this application further provides a communications device. FIG. 5 is a schematic structural diagram of a communications device according to an embodiment of this application. As shown in FIG. 5, the communications device 500 may be any physical device or virtual device that has a packet processing function, for example, a switch or a router, and is configured to implement an operation corresponding to the first device in any one of the foregoing method embodiments. The communications device 500 in this embodiment of this application may include an interface unit 501, a processing unit 502, and a memory 503. The processing unit 502 may be an integrated circuit, a field-programmable gate array (field-programmable gate array, FPGA), a chip, or the like, for example, an AQM module. The processing unit 502 and the memory 503 may be included in a switching circuit. The switching circuit is, for example, an SWB chip or a TM chip. The interface unit 501 is, for example, a port module, and may communicate with another device through an optical port, an electrical port, or a combination thereof. The memory 503 may be a volatile memory such as a RAM, or may be a non-volatile memory such as a ROM.

The interface unit 501 is configured to receive a packet from another communications device.

The processing unit 502 is configured to determine a first queue buffer used to store the packet.

The processing unit 502 is further configured to determine a first upper limit value of the first queue buffer based on an available value of a first port buffer and an available value of a global buffer.

The memory 503 includes a global buffer. The global buffer includes at least one port buffer, the first port buffer is one of the at least one port buffer, the first port buffer includes at least one queue buffer, and the first queue buffer is one of the at least one queue buffer. A shared buffer described in this embodiment of this application may be included in the memory 503.

The processing unit 502 is further configured to process the packet based on the first upper limit value of the first queue buffer, an occupation value of the first queue buffer, and a size of the packet.

In some embodiments, the processing unit 502 is configured to determine the first upper limit value of the first queue buffer based on a port sharing upper limit value and a global sharing upper limit value, where the port sharing upper limit value is equal to a product of the available value of the first port buffer and a first coefficient, and the global sharing upper limit value is equal to a product of the available value of the global buffer and a second coefficient.

In some embodiments, the processing unit 502 is configured to determine the first upper limit value of the first queue buffer based on the port sharing upper limit value, the global sharing upper limit value, and a preset lower limit value of the first queue buffer.

In some embodiments, the processing unit 502 is specifically configured to: determine the available value of the global buffer based on an upper limit value of the global buffer and an occupation value of the global buffer; determine an upper limit value of the first port buffer based on a third coefficient and the available value of the global buffer; and determine the available value of the first port buffer based on the upper limit value of the first port buffer and an occupation value of the first port buffer.

In some embodiments, the processing unit 502 is specifically configured to: discard the packet when a sum of the occupation value of the first queue buffer and the size of the packet is greater than the first upper limit value of the first queue buffer; or store the packet in the first queue buffer when a sum of the occupation value of the first queue buffer and the size of the packet is less than or equal to the first upper limit value of the first queue buffer.

In some embodiments, the processing unit 502 is specifically configured to: when a sum of the occupation value of the first queue buffer and the size of the packet is greater than the first upper limit value of the first queue buffer, add a congestion identifier to the packet, and store, in the first queue buffer, the packet to which the congestion identifier is added, where the congestion identifier is used to indicate that the first queue buffer is in a congestion state; or store the packet in the first queue buffer when a sum of the occupation value of the first queue buffer and the size of the packet is less than or equal to the first upper limit value of the first queue buffer.

In some embodiments, the processing unit 502 is specifically configured to: when a sum of the occupation value of the first queue buffer and the size of the packet is greater than the first upper limit value of the first queue buffer, store the packet in the first queue buffer, and send an indication signal to the interface unit; or store the packet in the first queue buffer when a sum of the occupation value of the first queue buffer and the size of the packet is less than or equal to the first upper limit value of the first queue buffer.

In some embodiments, the interface unit 501 is further configured to send a backpressure signal to the another communications device when receiving the indication signal, where the backpressure signal is used to instruct the another communications device to stop sending a packet or stop sending a packet after sending at least one packet whose total size is a specific value.

In some embodiments, the processing unit 502 is further configured to determine a second upper limit value of the first queue buffer based on the available value of the first port buffer and the available value of the global buffer, where the first upper limit value is greater than the second upper limit value; and the processing unit 502 is specifically configured to: discard the packet when a sum of the occupation value of the first queue buffer and the size of the packet is greater than the first upper limit value of the first queue buffer; or store the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choose, based on a probability value, to discard the packet or store the packet in the first queue buffer.

In some embodiments, the processing unit 502 is further configured to determine a second upper limit value of the first queue buffer based on the available value of the first port buffer and the available value of the global buffer, where the first upper limit value is greater than the second upper limit value; and the processing unit 502 is specifically configured to: when a sum of the occupation value of the first queue buffer and the size of the packet is greater than the first upper limit value of the first queue buffer, add a congestion identifier to the packet, and store, in the first queue buffer, the packet to which the congestion identifier is added, where the congestion identifier is used to indicate that the first queue buffer is in a congestion state; or store the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choose, based on a probability value, to store the packet in the first queue buffer or add the congestion identifier to the packet and store, in the first queue buffer, the packet to which the congestion identifier is added.

The communications device in this embodiment of this application may be configured to execute the technical solution of the first device in each method embodiment. An implementation principle and a technical effect of the communications device are similar, and are not described herein.

Figure 6:
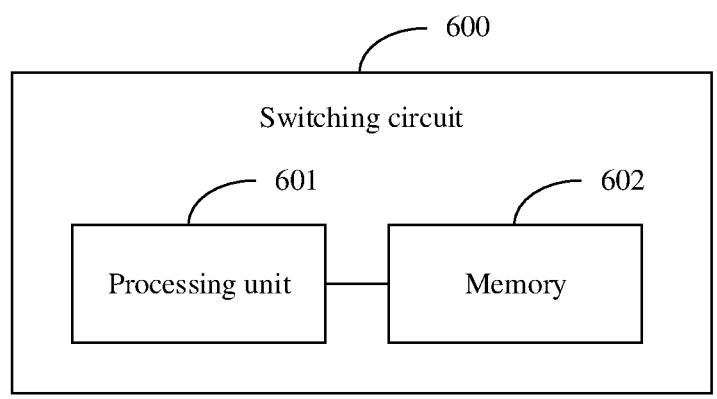
FIG. 6 is a schematic structural diagram of a switching circuit according to an embodiment of this application.

For example, an embodiment of this application further provides a switching circuit. FIG. 6 is a schematic structural diagram of the switching circuit according to an embodiment of this application. As shown in FIG. 6, the switching circuit 600 is an integrated circuit, a chip, or the like that has a storage function and a packet processing function, for example, a switching chip such as an SWB chip or a TM chip, and is configured to implement an operation corresponding to the first device in any one of the foregoing method embodiments. The switching circuit 600 may be the switching circuit in the communications device in the embodiment shown in FIG. 5. The switching circuit 600 includes a processing unit 601 and a memory 602.

The processing unit 601 is configured to receive a packet from another device.

The processing unit 601 is further configured to determine a first queue buffer used to store the packet.

The processing unit 601 is further configured to determine a first upper limit value of the first queue buffer based on an available value of a first port buffer and an available value of a global buffer.

The memory 602 includes a global buffer. The global buffer includes at least one port buffer, the first port buffer is one of the at least one port buffer, the first port buffer includes at least one queue buffer, and the first queue buffer is one of the at least one queue buffer.

The processing unit 601 is further configured to process the packet based on the first upper limit value of the first queue buffer, an occupation value of the first queue buffer, and a size of the packet.

In some embodiments, the processing unit 601 is configured to determine the first upper limit value of the first queue buffer based on a port sharing upper limit value and a global sharing upper limit value, where the port sharing upper limit value is equal to a product of the available value of the first port buffer and a first coefficient, and the global sharing upper limit value is equal to a product of the available value of the global buffer and a second coefficient.

In some embodiments, the processing unit 601 is configured to determine the first upper limit value of the first queue buffer based on the port sharing upper limit value, the global sharing upper limit value, and a preset lower limit value of the first queue buffer.

In some embodiments, the processing unit 601 is configured to: determine the available value of the global buffer based on an upper limit value of the global buffer and an occupation value of the global buffer; determine an upper limit value of the first port buffer based on a third coefficient and the available value of the global buffer; and determine the available value of the first port buffer based on the upper limit value of the first port buffer and an occupation value of the first port buffer.

In some embodiments, the processing unit 601 is specifically configured to: discard the packet when a sum of the occupation value of the first queue buffer and the size of the packet is greater than the first upper limit value of the first queue buffer; or store the packet in the first queue buffer when a sum of the occupation value of the first queue buffer and the size of the packet is less than or equal to the first upper limit value of the first queue buffer.

In some embodiments, the processing module 601 is specifically configured to: when a sum of the occupation value of the first queue buffer and the size of the packet is greater than the first upper limit value of the first queue buffer, add a congestion identifier to the packet, and store, in the first queue buffer, the packet to which the congestion identifier is added, where the congestion identifier is used to indicate that the first queue buffer is in a congestion state; or store the packet in the first queue buffer when a sum of the occupation value of the first queue buffer and the size of the packet is less than or equal to the first upper limit value of the first queue buffer.

In some embodiments, the processing unit 601 is specifically configured to: when a sum of the occupation value of the first queue buffer and the size of the packet is greater than the first upper limit value of the first queue buffer, store the packet in the first queue buffer, and send an indication signal, where the indication signal is used to indicate that the first queue buffer is in a congestion state; or store the packet in the first queue buffer when a sum of the occupation value of the first queue buffer and the size of the packet is less than or equal to the first upper limit value of the first queue buffer. The indication signal may be sent to an interface unit such as the interface unit 501 shown in FIG. 5, and is configured to trigger the interface unit to send a backpressure signal to a previous hop, that is, the another device.

In some embodiments, the processing unit 601 is further configured to determine a second upper limit value of the first queue buffer based on the available value of the first port buffer and the available value of the global buffer, where the first upper limit value is greater than the second upper limit value; and the processing unit 601 is specifically configured to: discard the packet when a sum of the occupation value of the first queue buffer and the size of the packet is greater than the first upper limit value of the first queue buffer; or store the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choose, based on a probability value, to discard the packet or store the packet in the first queue buffer.

In some embodiments, the processing unit 601 is further configured to determine a second upper limit value of the first queue buffer based on the available value of the first port buffer and the available value of the global buffer, where the first upper limit value is greater than the second upper limit value; and the processing unit 601 is specifically configured to: when a sum of the occupation value of the first queue buffer and the size of the packet is greater than the first upper limit value of the first queue buffer, add a congestion identifier to the packet, and store, in the first queue buffer, the packet to which the congestion identifier is added, where the congestion identifier is used to indicate that the first queue buffer is in a congestion state; or store the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choose, based on a probability value, to store the packet in the first queue buffer or add the congestion identifier to the packet and store, in the first queue buffer, the packet to which the congestion identifier is added.

The switching circuit in this embodiment of this application may be configured to execute the technical solution of the first device in each method embodiment. An implementation principle and a technical effect are similar, and are not described herein.

Figure 7:
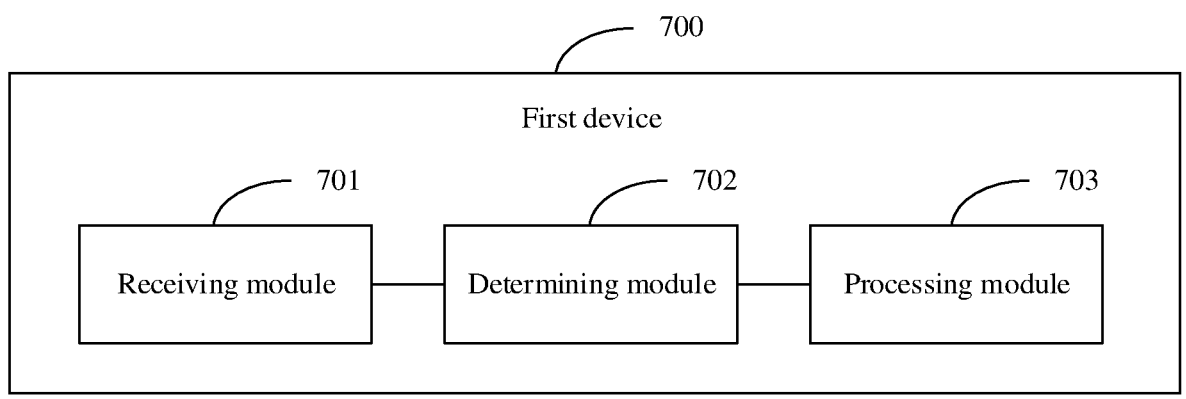
FIG. 7 is a schematic structural diagram of a first device according to an embodiment of this application.

For example, an embodiment of this application further provides a first device. FIG. 7 is a schematic structural diagram of the first device according to an embodiment of this application. As shown in FIG. 7, the first device 700 may be any physical device or virtual device that has a packet processing function, for example, a switch or a router, and is configured to implement an operation corresponding to the first device in any one of the foregoing method embodiments. The first device 700 in this embodiment of this application may include: a receiving module 701, configured to receive a packet from a second device; a determining module 702, configured to determine a first queue buffer used to store the packet, where the determining module 702 is configured to determine a first upper limit value of the first queue buffer based on an available value of a first port buffer and an available value of a global buffer, where the global buffer includes at least one port buffer, the first port buffer is one of the at least one port buffer, the first port buffer includes at least one queue buffer, and the first queue buffer is one of the at least one queue buffer; and a processing module 703, configured to process the packet based on the first upper limit value of the first queue buffer, an occupation value of the first queue buffer, and a size of the packet.

In some embodiments, the determining module 702 is specifically configured to determine the first upper limit value of the first queue buffer based on a port sharing upper limit value and a global sharing upper limit value, where the port sharing upper limit value is equal to a product of the available value of the first port buffer and a first coefficient, and the global sharing upper limit value is equal to a product of the available value of the global buffer and a second coefficient.

In some embodiments, the determining module 702 is specifically configured to determine the first upper limit value of the first queue buffer based on the port sharing upper limit value, the global sharing upper limit value, and a preset lower limit value of the first queue buffer.

In some embodiments, the determining module 702 is specifically configured to: determine the available value of the global buffer based on an upper limit value of the global buffer and an occupation value of the global buffer; determine an upper limit value of the first port buffer based on a third coefficient and the available value of the global buffer; and determine the available value of the first port buffer based on the upper limit value of the first port buffer and an occupation value of the first port buffer.

In some embodiments, the processing module 703 is specifically configured to: discard the packet when a sum of the occupation value of the first queue buffer and the size of the packet is greater than the first upper limit value of the first queue buffer; or store the packet in the first queue buffer when a sum of the occupation value of the first queue buffer and the size of the packet is less than or equal to the first upper limit value of the first queue buffer.

In some embodiments, the processing module 703 is specifically configured to: when a sum of the occupation value of the first queue buffer and the size of the packet is greater than the first upper limit value of the first queue buffer, add a congestion identifier to the packet, and store, in the first queue buffer, the packet to which the congestion identifier is added, where the congestion identifier is used to indicate that the first queue buffer is in a congestion state; or store the packet in the first queue buffer when a sum of the occupation value of the first queue buffer and the size of the packet is less than or equal to the first upper limit value of the first queue buffer.

In some embodiments, the processing module 703 is specifically configured to: when a sum of the occupation value of the first queue buffer and the size of the packet is greater than the first upper limit value of the first queue buffer, store the packet in the first queue buffer, and send a backpressure signal to the second device, where the backpressure signal is used to instruct the second device to stop sending a packet or stop sending a packet after sending at least one packet whose total size is a specific value; or store the packet in the first queue buffer when a sum of the occupation value of the first queue buffer and the size of the packet is less than or equal to the first upper limit value of the first queue buffer.

In some embodiments, the determining module 702 is specifically configured to determine a second upper limit value of the first queue buffer based on the available value of the first port buffer and the available value of the global buffer, where the first upper limit value is greater than the second upper limit value; and the processing module 703 is specifically configured to: discard the packet when a sum of the occupation value of the first queue buffer and the size of the packet is greater than the first upper limit value of the first queue buffer; or store the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choose, based on a probability value, to discard the packet or store the packet in the first queue buffer.

In some embodiments, the determining module 702 is specifically configured to determine a second upper limit value of the first queue buffer based on the available value of the first port buffer and the available value of the global buffer, where the first upper limit value is greater than the second upper limit value; and the processing module 703 is specifically configured to: when a sum of the occupation value of the first queue buffer and the size of the packet is greater than the first upper limit value of the first queue buffer, add a congestion identifier to the packet, and store, in the first queue buffer, the packet to which the congestion identifier is added, where the congestion identifier is used to indicate that the first queue buffer is in a congestion state; or store the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choose, based on a probability value, to store the packet in the first queue buffer or add the congestion identifier to the packet and store, in the first queue buffer, the packet to which the congestion identifier is added.

The first device in this embodiment of this application may be configured to execute the technical solution in each method embodiment. An implementation principle and a technical effect are similar, and are not described herein.

Figure 8:
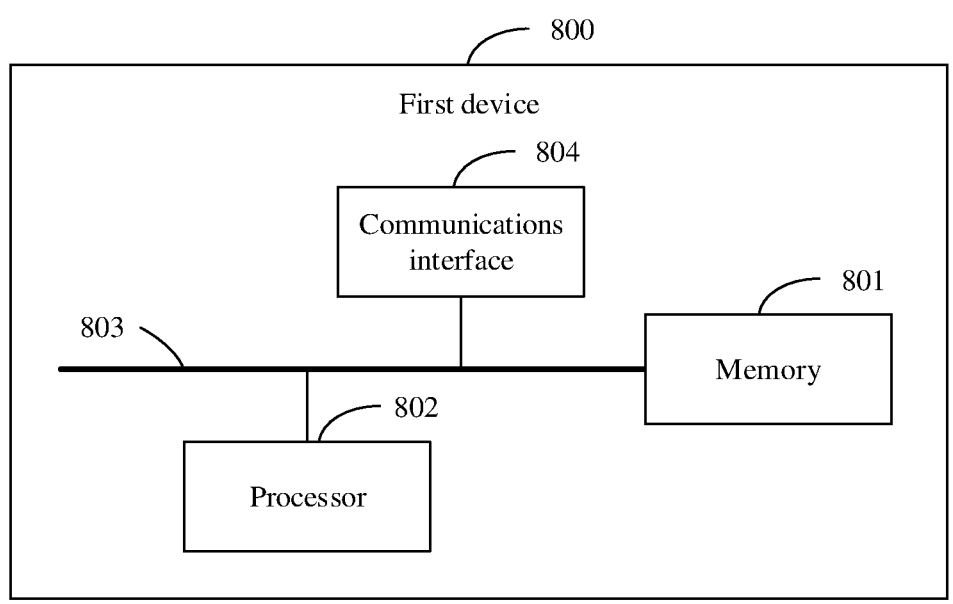
FIG. 8 is a schematic structural diagram of hardware of a first device according to an embodiment of this application.

FIG. 8 is a schematic structural diagram of hardware of a first device according to an embodiment of this application. As shown in FIG. 8, the first device 800 may be any physical device or virtual device that has a packet processing function, for example, a switch or a router, and is configured to implement an operation corresponding to the first device in any one of the foregoing method embodiments. The first device 800 in this embodiment of this application may include a memory 801 and a processor 802. The memory 801 and the processor 802 may be connected by using a bus 803.

The memory 801 is configured to store program code.

The processor 802 invokes program code, and when the program code is executed, the processor 802 is configured to perform the packet processing method in any one of the foregoing embodiments. For details, refer to related descriptions in the foregoing method embodiments.

Optionally, this embodiment of this application further includes a communications interface 804. The communications interface 804 may be connected to the processor 802 by using a bus. The processor 802 may control the communications interface 804 to implement the foregoing receiving and sending functions of the first device 800.

The first device in this embodiment of this application may be used to execute the technical solutions of the foregoing method embodiments. The implementation principles and technical effects are similar, and are not further described herein.

In the several embodiments provided in this application, it should be understood that the disclosed device and method may be implemented in other manners. For example, the described device embodiment is merely an example. For example, the module division is merely logical function division and may be other division in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. Some or all the modules may be selected according to actual needs to achieve the objectives of the solutions of the embodiments of this application.

In addition, functional modules in the embodiments of this application may be integrated into one processing unit or each of the modules may exist alone physically, or two or more modules are integrated into one unit. The unit integrated in the foregoing module may be implemented in a form of hardware, or may be implemented in a form of hardware in addition to a software functional unit.

When the foregoing integrated module is implemented in a form of a software functional module, the integrated unit may be stored in a computer-readable storage medium. The software functional module is stored in a storage medium and includes several instructions for instructing a computer device (which may be a personal computer, a server, or a network device) or a processor to perform some of the steps of the methods described in the embodiments of this application.

It should be understood that the processor may be a central processing unit (CPU for short), or may be another general-purpose processor, a digital signal processor (DSP for short), an application-specific integrated circuit (ASIC for short), or the like. The general purpose processor may be a microprocessor, or the processor may be any conventional processor or the like. The steps of the method disclosed with reference to the present invention may be directly performed by a hardware processor, or may be performed by using a combination of hardware in the processor and a software module.

The memory may include a high-speed RAM memory, or may include a non-volatile memory NVM such as at least one magnetic disk memory, or may include a USB flash drive, a removable hard disk, a read-only memory, a magnetic disk, an optical disc, or the like.

The bus in this application may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    receiving, by a first device, a packet from a second device;
    determining, by the first device, a first queue buffer that is usable to store the packet;
    determining, by the first device, a first upper limit value of the first queue buffer based on a port sharing upper limit value of a first port buffer and a global sharing upper limit value of a global buffer, wherein the port sharing upper limit is equal to a product of an available value of the first port buffer and a first coefficient, and the global sharing upper limit value is equal to a product of an available value of the global buffer and a second coefficient, and wherein the global buffer comprises at least one port buffer, the first port buffer is comprised in the at least one port buffer, the first port buffer comprises at least one queue buffer, and the first queue buffer is comprised in the at least one queue buffer; and processing, by the first device, the packet based on the first upper limit value of the first queue buffer, an occupation value of the first queue buffer, and a size of the packet.

2. The method according to claim 1, wherein determining, by the first device, the first upper limit value of the first queue buffer based on the port sharing upper limit value and the global sharing upper limit value comprises:

determining, by the first device, the first upper limit value of the first queue buffer based on the port sharing upper limit value, the global sharing upper limit value, and a preset lower limit value of the first queue buffer.

3. The method according to claim 1, further comprising:

determining, by the first device, the available value of the global buffer based on an upper limit value of the global buffer and an occupation value of the global buffer;

determining, by the first device, an upper limit value of the first port buffer based on a third coefficient and the available value of the global buffer; and determining, by the first device, the available value of the first port buffer based on the upper limit value of the first port buffer and an occupation value of the first port buffer.

4. The method according to claim 1, wherein processing, by the first device, the packet based on the first upper limit value of the first queue buffer, the occupation value of the first queue buffer, and the size of the packet comprises:

discarding, by the first device, the packet when a sum of the occupation value of the first queue buffer and the size of the packet is greater than the first upper limit value of the first queue buffer; or storing, by the first device, the packet in the first queue buffer when a sum of the occupation value of the first queue buffer and the size of the packet is less than or equal to the first upper limit value of the first queue buffer.

5. The method according to claim 1, wherein processing, by the first device, the packet based on the first upper limit value of the first queue buffer, the occupation value of the first queue buffer, and the size of the packet comprises:

when a sum of the occupation value of the first queue buffer and the size of the packet is greater than the first upper limit value of the first queue buffer, adding, by the first device, a congestion identifier to the packet, and storing, in the first queue buffer, the packet to which the congestion identifier is added, wherein the congestion identifier indicates that the first queue buffer is in a congestion state; or storing, by the first device, the packet in the first queue buffer when a sum of the occupation value of the first queue buffer and the size of the packet is less than or equal to the first upper limit value of the first queue buffer.

6. The method according to claim 1, wherein processing, by the first device, the packet based on the first upper limit value of the first queue buffer, the occupation value of the first queue buffer, and the size of the packet comprises:

when a sum of the occupation value of the first queue buffer and the size of the packet is greater than the first upper limit value of the first queue buffer, storing, by the first device, the packet in the first queue buffer, and sending a backpressure signal to the second device, wherein the backpressure signal instructs the second device to stop sending a packet, or to stop sending a packet after sending at least one packet whose total size is a specific value; or storing, by the first device, the packet in the first queue buffer when a sum of the occupation value of the first queue buffer and the size of the packet is less than or equal to the first upper limit value of the first queue buffer.

7. The method according to claim 1, further comprising:

determining, by the first device, a second upper limit value of the first queue buffer based on the available value of the first port buffer or the available value of the global buffer, wherein the first upper limit value is greater than the second upper limit value; and wherein processing, by the first device, the packet based on the first upper limit value of the first queue buffer, the occupation value of the first queue buffer, and the size of the packet comprises:

discarding, by the first device, the packet when a sum of the occupation value of the first queue buffer and the size of the packet is greater than the first upper limit value of the first queue buffer; or storing, by the first device, the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choosing, by the first device based on a probability value, to discard the packet or store the packet in the first queue buffer.

8. The method according to claim 1, further comprising:

determining, by the first device, a second upper limit value of the first queue buffer based on the available value of the first port buffer and the available value of the global buffer, wherein the first upper limit value is greater than the second upper limit value; and wherein processing, by the first device, the packet based on the first upper limit value of the first queue buffer, the occupation value of the first queue buffer, and the size of the packet comprises:

when a sum of the occupation value of the first queue buffer and the size of the packet is greater than the first upper limit value of the first queue buffer, adding, by the first device, a congestion identifier to the packet, and storing, in the first queue buffer, the packet to which the congestion identifier is added, wherein the congestion identifier indicates that the first queue buffer is in a congestion state; or storing, by the first device, the packet in the first queue buffer when a sum of the occupation value of the first queue buffer and the size of the packet is less than the second upper limit value of the first queue buffer; or when a sum of the occupation value of the first queue buffer and the size of the packet is greater than the second upper limit value of the first queue buffer and is less than the first upper limit value of the first queue buffer, choosing, by the first device based on a probability value, to store the packet in the first queue buffer or add a congestion identifier to the packet and storing, in the first queue buffer, the packet to which the congestion identifier is added.

9. A communications device, comprising:
an interface;
a processor; and
a non-transitory memory storing a program executable by the processor;
wherein the interface is configured to receive a packet from another communications device;
wherein the program includes instructions for:
  determining a first queue buffer usable to store the packet; and
  determining a first upper limit value of the first queue buffer based on a port sharing upper limit value of a first port buffer and a global sharing upper limit value of a global buffer, wherein the port sharing upper limit value is equal to a product of an available value of the first port buffer and a first coefficient, and the global sharing upper limit value is equal to a product of an available value of the global buffer and a second coefficient, and wherein the non-transitory memory comprises the global buffer, wherein the global buffer comprises at least one port buffer, the first port buffer is comprised in the at least one port buffer, the first port buffer comprises at least one queue buffer, and the first queue buffer is comprised in the at least one queue buffer; and
wherein the program further includes instructions for processing the packet based on the first upper limit value of the first queue buffer, an occupation value of the first queue buffer, and a size of the packet.

10. The communications device according to claim 9, wherein the program further includes instructions for:
determining the first upper limit value of the first queue buffer based on the port sharing upper limit value, the global sharing upper limit value, and a preset lower limit value of the first queue buffer.

11. The communications device according to claim 9, wherein the program further includes instructions for:
determining the available value of the global buffer based on an upper limit value of the global buffer and an occupation value of the global buffer;
determining an upper limit value of the first port buffer based on a third coefficient and the available value of the global buffer; and
determining the available value of the first port buffer based on the upper limit value of the first port buffer and an occupation value of the first port buffer.

12. The communications device according to claim 9, wherein the program further includes instructions for:
discarding the packet when a sum of the occupation value of the first queue buffer and the size of the packet is greater than the first upper limit value of the first queue buffer; or
storing the packet in the first queue buffer when a sum of the occupation value of the first queue buffer and the size of the packet is less than or equal to the first upper limit value of the first queue buffer.

13. The communications device according to claim 9, wherein the program further includes instructions for:
when a sum of the occupation value of the first queue buffer and the size of the packet is greater than the first upper limit value of the first queue buffer, adding a congestion identifier to the packet, and storing, in the first queue buffer, the packet to which the congestion identifier is added, wherein the congestion identifier indicates that the first queue buffer is in a congestion state; or
storing the packet in the first queue buffer when a sum of the occupation value of the first queue buffer and the size of the packet is less than or equal to the first upper limit value of the first queue buffer.

14. The communications device according to claim 9, wherein the program further includes instructions for:
when a sum of the occupation value of the first queue buffer and the size of the packet is greater than the first upper limit value of the first queue buffer, storing the packet in the first queue buffer, and sending an indication signal to the interface; or
storing the packet in the first queue buffer when a sum of the occupation value of the first queue buffer and the size of the packet is less than or equal to the first upper limit value of the first queue buffer.

15. The communications device according to claim 14, wherein the interface is further configured to send a backpressure signal to the another communications device when receiving the indication signal, wherein the backpressure signal instructs the another communications device to stop sending a packet, or stop sending a packet after sending at least one packet whose total size is a specific value.

16. The communications device according to claim 9, wherein the program further includes instructions for:
determining a second upper limit value of the first queue buffer based on the available value of the first port buffer and the available value of the global buffer, wherein the first upper limit value is greater than the second upper limit value; and
performing the following:
  discarding the packet when a sum of the occupation value of the first queue buffer and the size of the packet is greater than the first upper limit value of the first queue buffer; or
  storing the packet in the first queue buffer when a sum of the occupation value of the first queue buffer and the size of the packet is less than the second upper limit value of the first queue buffer; or
  when a sum of the occupation value of the first queue buffer and the size of the packet is greater than the second upper limit value of the first queue buffer and is less than the first upper limit value of the first queue buffer, choosing, based on a probability value, to discard the packet or store the packet in the first queue buffer.

17. The communications device according to claim 9, wherein the program further includes instructions for:
determining a second upper limit value of the first queue buffer based on the available value of the first port buffer and the available value of the global buffer, wherein the first upper limit value is greater than the second upper limit value; and
performing the following:
  when a sum of the occupation value of the first queue buffer and the size of the packet is greater than the first upper limit value of the first queue buffer, adding a congestion identifier to the packet, and storing, in the first queue buffer, the packet to which the congestion identifier is added, wherein the congestion identifier indicates that the first queue buffer is in a congestion state; or
  storing the packet in the first queue buffer when a sum of the occupation value of the first queue buffer and the size of the packet is less than the second upper limit value of the first queue buffer; or
  when a sum of the occupation value of the first queue buffer and the size of the packet is greater than the second upper limit value of the first queue buffer and is less than the first upper limit value of the first queue buffer, choosing, based on a probability value, to store the packet in the first queue buffer or add the congestion identifier to the packet, and storing, in the first queue buffer, the packet to which the congestion identifier is added.

18. A non-transitory readable storage medium, wherein the non-transitory readable storage medium stores a computer program, and when the computer program is executed by a computer, the execution of the computer program causes the computer to:

receive a packet from a second device;

determine a first queue buffer used to store the packet;

determine a first upper limit value of the first queue buffer based on a port sharing upper limit value of a first port buffer and a global sharing upper limit value of a global buffer, wherein the port sharing upper limit value is equal to a product of an available value of the first port buffer and a first coefficient, and the global sharing upper limit value is equal to a product of an available value of the global buffer and a second coefficient, and wherein the global buffer comprises at least one port buffer, the first port buffer is comprised in the at least one port buffer, the first port buffer comprises at least one queue buffer, and the first queue buffer is comprised in the at least one queue buffer; and process the packet based on the first upper limit value of the first queue buffer, an occupation value of the first queue buffer, and a size of the packet.

* * * * *